United States Patent [19]

Masaki et al.

[11] Patent Number: 4,546,449

[45] Date of Patent: Oct. 8, 1985

[54] OUTPUT DEVICE CAPABLE OF AUTOMATICALLY DETERMINING AN OUTPUT FORMAT

[75] Inventors: Katsumi Masaki, Sagamihara; Toshifumi Tago, Tokyo, both of Japan

[73] Assignee: Canon Kabushiki Kaisha, Tokyo, Japan

[21] Appl. No.: 639,616

[22] Filed: Aug. 10, 1984

Related U.S. Application Data

[63] Continuation of Ser. No. 305,022, Sep. 23, 1981, abandoned.

[30] Foreign Application Priority Data

Sep. 29, 1980 [JP] Japan ........................ 55-135573

[51] Int. Cl.$^4$ ........................ G06F 3/00

[52] U.S. Cl. ........................ 364/900

[58] Field of Search ... 364/200 MS File, 900 MS File

[56] References Cited

U.S. PATENT DOCUMENTS

| | | | |
|---|---|---|---|
| 3,165,045 | 1/1965 | Troll | 178/15 |
| 3,267,454 | 8/1966 | Schaaf | 178/15 |
| 3,690,231 | 9/1972 | Storch | 354/9 |
| 3,805,940 | 4/1974 | Stockham | 354/9 |
| 3,971,044 | 7/1976 | Findley | 354/9 |
| 3,999,168 | 12/1976 | Findley | 364/900 |
| 4,031,519 | 6/1977 | Findley | 364/900 |
| 4,265,556 | 5/1981 | Krieg et al. | 400/708 |
| 4,272,204 | 6/1981 | Quinn, Jr. et al. | 400/708 X |

OTHER PUBLICATIONS

Coleman, A. H., "IEEE Transactions on Aerospace and Electronic Systems", Nov. 1970, pp. 804–810.

*Primary Examiner*—Raulfe B. Zache

*Attorney, Agent, or Firm*—Fitzpatrick, Cella, Harper & Scinto

[57] ABSTRACT

An output device capable of automatically producing a balanced output format comprises a unit for measuring a width of a recording medium, a unit for determining an output format such as a character pitch and margin values based on the width of the recording medium and the number of characters per line to be recorded on the recording medium, and a recording unit which outputs characters in accordance with the determined output format.

28 Claims, 24 Drawing Figures

OUTPUT DEVICE CAPABLE OF AUTOMATICALLY DETERMINING AN OUTPUT FORMAT

This application is a continuation of application Ser. No. 305,022 filed Sept. 23, 1981, now abandoned.

BACKGROUND OF THE INVENTION

1. Field of the Invention

The present invention relates to an output device capable of automatically determining a character output format for a recording medium.

2. Description of the Prior Art

An output device capable of providing characters without specifying a character pitch or margin has been known. In such a device, since the character pitch and the margin are fixed, a balanced output format as desired by an operator could not be produced. For example, where a left margin and the character pitch are fixed, if the number of characters in a line changes, a right margin will significantly change.

An output device capable of providing characters without specifying the character pitch has been known. In such a device, however, the character pitch is fixed and not variable. Accordingly, when the characters are provided on the recording medium by specifying the left margin, the right margin varies significantly depending on the number of characters in a line. Accordingly, an improvement has been desired to provide a balanced output format.

An output device capable of providing characters without automatically determining a margin has been known. In such a device, however, the margin is fixed and cannot varied as desired. Accordingly, the left and right margins in the output are not uniformly arranged and an unbalanced output format is produced.

An output device capable of providing characters without specifying the character pitch or the left and right margins has been known. In such a device, however, the character pitch and the left and right margins are fixed and cannot be varied in accordance with the size of the output medium. Accordingly, the same left margin or right margin is used for a narrow output medium and a wide output medium and hence an unbalanced output format is produced.

An output device capable of providing characters in accordance with a specified output format has been known. However, this device fails to provide for checking whether an output format has been correctly set before the characters are provided. Accordingly, the invalidity of the output format is detected only after an output command has been issued to the output device. As a result, papers are wasted or the unbalanced output format is detected only after output of the characters.

An output format error indicator which checks the validity of a given number of characters in a line and a given width of the output medium for the output format and indicates any invalidity has been known. In this device although an operator can specify the width of the output medium, the operator cannot use the device unless he or she knows the particular width of the output medium.

An output device capable of providing the characters while automatically determining a portion of the output format has been known. In this device, however, the output format automatically determined can only be seen after output of the characters.

SUMMARY OF THE INVENTION

It is an object of the present invention to provide an improved output device which overcomes the above difficulties.

It is another object of the present invention to provide an output device capable of producing a balanced output format by automatically determining proper margins and a character pitch based on a width of a recording medium and the number of characters in a line.

It is another object of the present invention to provide an output device capable of rapidly detecting the width of the recording medium by recording medium width measuring means.

It is a further object of the present invention to provide an output device capable of specifying a left margin or a right margin and the number of characters in a line and of producing a balanced output format without intervention of an operator by automatically determining a proper character pitch.

It is still another object of the present invention to provide an output device capable of producing a balanced outout format by automatically determining a proper margin based on the character pitch, the width of the recording medium and the number of characters in a line.

It is still another object of the present invention to provide an output device having pitch specifying means so that an operator can readily specify the character pitch.

It is still another object of the present invention to provide an output device having output format setting means for automatically setting a left margin or a right margin in accordance with the width of the recording medium so that the output format has the left or right margin compatible with the width of the recording medium.

It is still another object of the present invention to provide an output device having means for automatically measuring the width of the recording medium so that a balanced, high quality output format can be produced even if an operator has no information on the width of the recording medium.

It is still a further object of the present invention to provide an output device having output instruction means and output format check instruction means for checking the output format so that the output format can be checked before output of the characters.

It is another object of the present invention to provide an output device having display means for displaying any invalidity of the output format to an operator if such invalidity is detected by the output format check instruction means so that the operator can immediately be informed of the result of the format check.

It is another object of the present invention to provide an output device having means for displaying an output format when no invalidity is detected in the output format by the check made by the output format check instruction means, or the output format is set in a non-specified mode so that the operator can identify the output format or can modify the output format if desired.

It is another object of the present invention to provide an output device capable of setting an output format in a non-specified mode by checking the output format by the output format check instruction means.

It is another object of the present invention to provide an output device capable of checking the validity of the output format by automatically measuring the width of the recording medium without requiring inputting of such a width by the operator and informing of any invalidity to the operator.

It is another object of the present invention to provide an output device having means for automatically displaying the automatically set output format by an output format display means so that the operator can readily be informed of the automatically set output format.

It is another object of the present invention to provide an output device having output format display means for displaying the automatically set output format so that the operator can readily modify the automatically set output format.

These and other objects of the present invention will be apparent from the following description of the preferred embodiments of the present invention when taken in conjunction with the accompanying drawings.

DETAILED DESCRIPTION OF THE PREFERRED EMBODIMENTS

Figure 1:
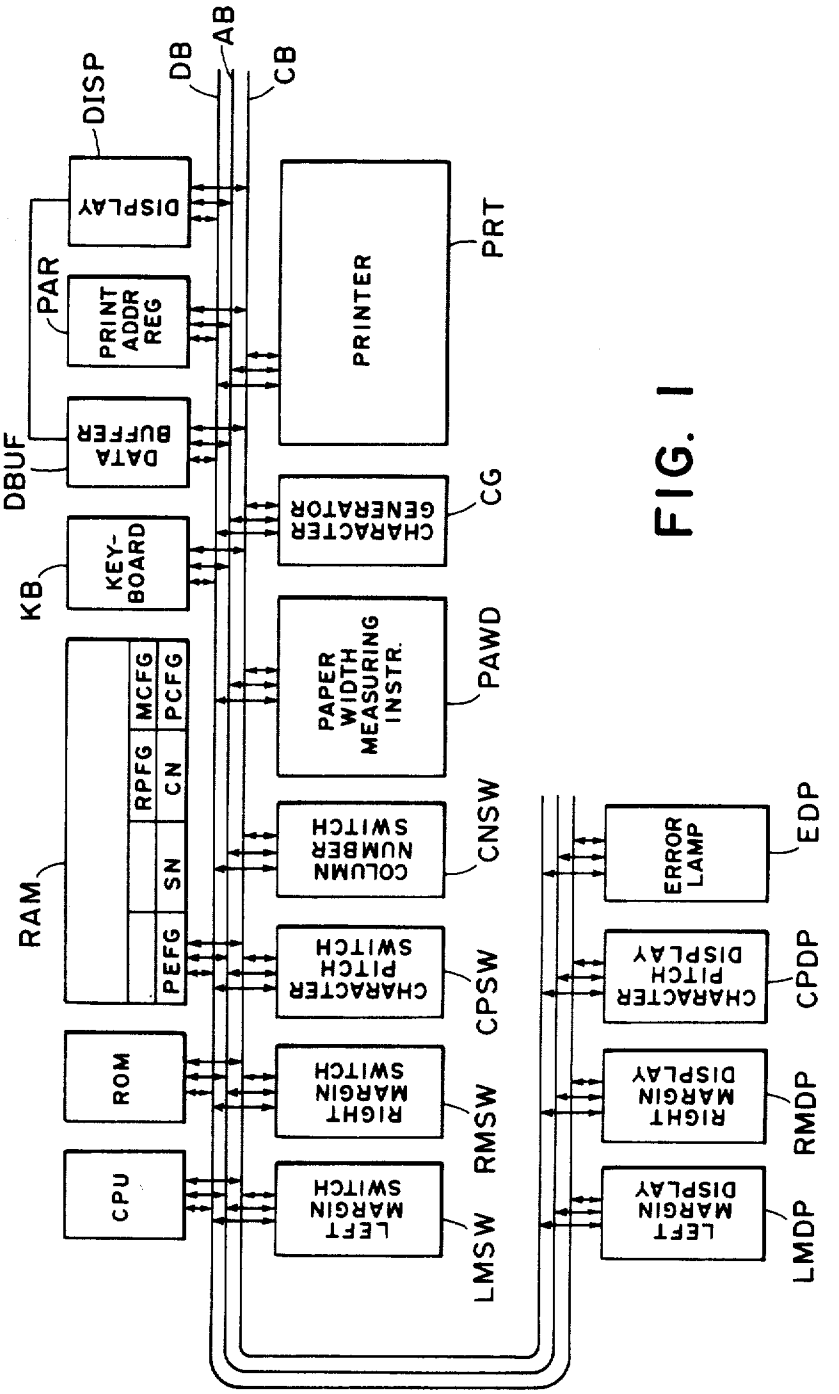
FIG. 1 shows a block diagram of one embodiment of the present invention.

FIG. 1 shows a block diagram of one embodiment of the present invention. CPU denotes a microprocessor which carries out arithmetic and logic operations, and control equipment connected through an address bus AB, a control bus CB and a data bus DB to be described later.

AB denotes the address bus which transfers signals for indicating subjects to be controlled.

CB denotes the control bus which supplies control signals to the subjects to be controlled.

DB denotes the data bus which transfers data.

ROM denotes a control memory which stores control procedures.

RAM denotes a random access memory which temporarily stores the data. It may include flags RPFG, MCFG, PEFG and PCFG, and registers SN and CN.

KB denotes a keyboard having keys by which an operator inputs information to the device. The keys include character keys for inputting characters and function keys for instructing various functions. The character keys may be a JIS (Japanese Industrial Standard) keyboard for inputting the characters. The function keys include a print key for initiating the instruction of a print operation and a print position setting key for initiating a check of a print format.

Figure 2:
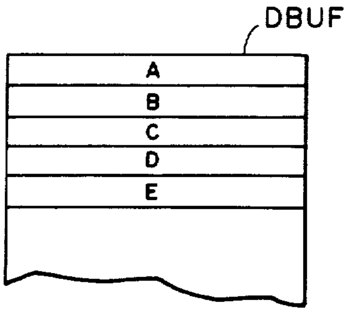
FIG. 2 shows a configuration of a data buffer.

DBUF denotes a buffer which stores input data from the keyboard KB. FIG. 2 shows a character string stored in the buffer DBUF.

Figure 3:
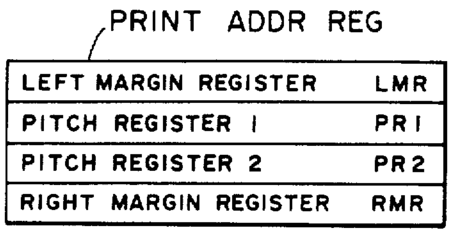
FIG. 3 shows detail of a print address register.

PRINT ADDR REG denotes a print address register which stores information for determining the print positions of the characters when the information stored in the buffer DBUF is printed out. It includes a left margin register LMR, a pitch register−1 PR1, a pitch register−2 PR2 and a right margin register RMR, as shown in FIG. 3. In the present embodiment, a dot printer is used so that data is stored by the number of dots. The left margin in the print format is defined by the LMR dots, the right margin is defined by the RMR dots and the character pitch is defined by the PR1+1 dots for the first two characters and by the PR1 dots for the remaining characters.

Figure 4:
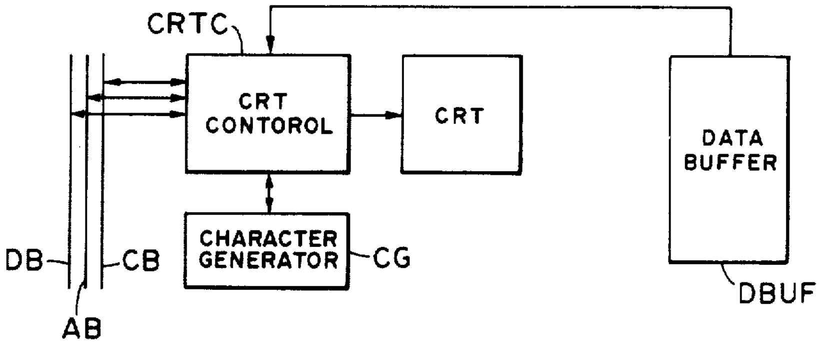
FIG. 4 shows detail of a display.

DISP denotes a display which displays the character information stored in the buffer DBUF. As shown in FIG. 4, it includes a display CRT, a control circuit CRTC for controlling the display CRT and a character generator CG which stores character patterns to be displayed on the display CRT.

Figure 5:
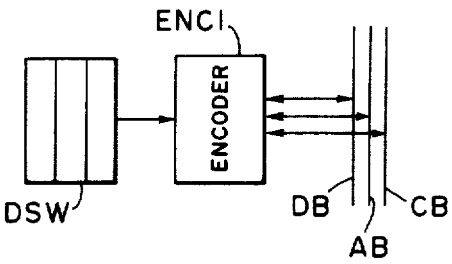
FIG. 5 shows detail of a detection switch.

LMSW denotes a left margin switch which includes a 3-digit digital switch DSW and an encoder ENC1 as shown in FIG. 5. The data which is inputted by the operator is converted to binary data by the encoder ENC1 and the microprocessor CPU can directly read the binary converted data. This switch is used by the operator to set the left margin in the print format and it specifies the left margin of the print format by the number of dots.

RMSW denotes a right margin switch which is constructed similarly to the left margin switch LMSW shown in FIG. 5. This switch is used by the operator to set the right margin of the print format and it specifies the right margin of the print format by the number of dots.

CPSW denotes a character pitch switch which is constructed similarly to the left margin switch LMSW shown in FIG. 5. This switch is used by the operator to specify the character pitch in the print format by the number of dots.

CNSW denotes a number of columns switch which is constructed similarly to the left margin switch shown in FIG. 5. This switch is used by the operator to specify the number of characters printed in one line.

Figure 6A:
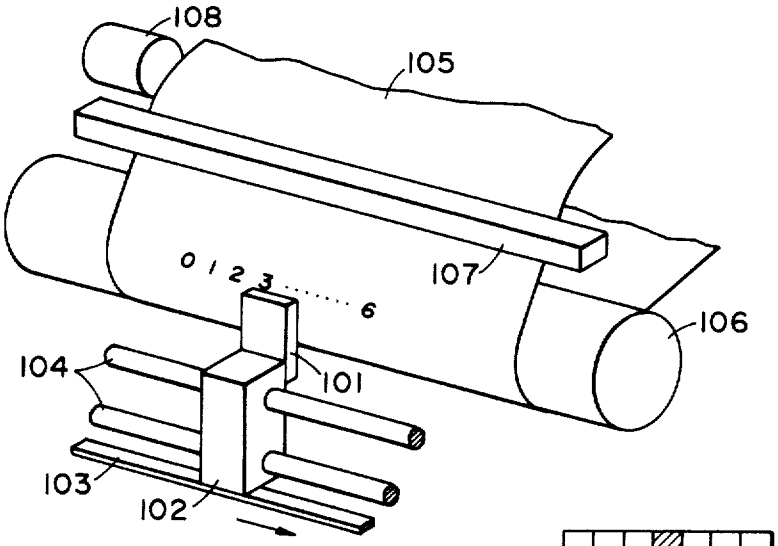
FIG. 6A shows a print format.
Figure 6B:
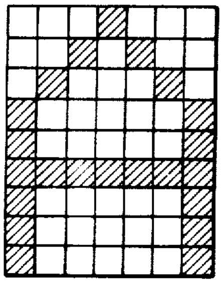
FIG. 6 shows a perspective view of a printer.

PRT denotes a printer which comprises a printer mechanism, shown in FIG. 6, which includes a thermal print head 101, a carriage 102, a carriage drive belt 103, a carriage guide 104, a printing form 105, a platen 106 and a printing form guide 108, and a known control unit, not shown for controlling the printer mechanism. The thermal head 101 may be a 9×1-dot thermal element. The printer allows printing of a 9×7-dot matrix character pattern as shown in FIG. 6. The printer is constructed to drive the carriage 102 one dot position at a time under the control of the microprocessor CPU and return the carriage 102 in response to a carriage return line feed signal CRLF and feed the form by a predetermined amount.

Figure 7:
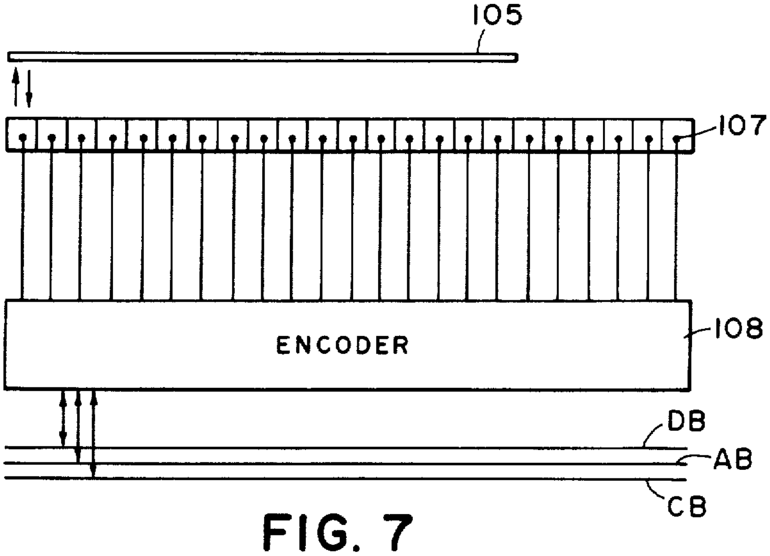
FIG. 7 shows detail of a paper width measuring instrument.

PAWD denotes a paper width measuring instrument which, as shown in FIG. 7, comprises a plurality of reflection type paper detectors 107 arranged in parallel to the printing form 105 and an encoder 108 which receives output data from the paper detectors 107 and converts it to a signal representing the paper width of the printing form. Each of the reflection type paper detectors 107 comprises a set of a light emitter and a light sensor and detects the presence or absence of the printing form by detecting the light emitted by the light emitter and reflected by the printing paper, by the light sensor. The encoder 108 receives the output data from the plurality of reflection type paper detectors 107 to determine the size of the form. The encoder 108 may be a read-only memory ROM which is responsive to the input data to produce the lateral dimension of the form by the number of dots.

Since the plurality of reflection type paper detectors 107 are arranged in parallel to the printing form as shown in FIG. 6, the width of the printing form inserted in the printer can be readily detected.

CG denotes a character generator which stores 9×7-dot matrix character patterns. When the characters are to be supplied to the printer, the microprocessor CPU provides that the character generator CG to convert the character codes to the character patterns.

LMDP denotes a left margin display which displays the left margin of the print form by the number of dots.

RMDP denotes a right margin display which display the right margin of the print form by the number of dots.

CPDP denotes a character pitch display which displays the character pitch of the print format by the number of dots.

EDP denotes an error lamp which is lit when printing is not effected in the specified print format such as the setting of the left margin switch LMSW, the setting of the right margin switch RMSW, the setting of the character pitch switch CPSW o the setting of the number of columns switch CNSW.

The operation of the present embodiment will be generally explained.

The operator activates the power of the device, inputs a text by the keyboard KB while watching the display CRT and edits the data to provide the text to be printed out. Then, the operator specifies a print format (left margin, right margin, character pitch and, the number of columns) and depresses the print key so that the print-out of the input text is started. The print format is specified by the left margin switch LMSW, the right margin switch RMSW, the character pitch switch CPSW and the number of columns switch CNSW. When commencement of the print operation is instructed by the print key, the device of the present invention measures the width of the print form to check if printing can be effected by the specified print format values. If printing can be effected or permitted, those print format values (which may be different from the print format to be actually printed) are first displayed on the print format display (the left margin display LMDP, the right margin display RMDP and the character pitch display CPDP) and then the printing is started. If the printing can not be permitted, the error lamp EDP is turned on. When it is turned on, the operator changes the print format and again depresses the print key to start the printing. The present device has the function of checking whether the printing by the print format values is permitted prior to the printing. If printing is then permitted, those print format values are then displayed on the print format display (including LMDP, RMDP and CPDP). If the operator is satisfied by the values displayed on the print format display, the operator depresses the print key so that the printing is carried out with the print format displayed on the print format display. If the operator is again not satisfied with the values displayed on the print format display, the operator modifies the print format by depressing the print format switches (LMSW, RMSW, CPSW, CNSW) and the depresses the print key to start the printing. If the printing is again not permitted, the error lamp is turned on. In this case, the operator again has to modify the print format values.

The meanings of the print format values are now explained. The left margin value indicates the distance from the left edge of the form to the position at which a character is to be printed. In the present embodiment, it is specified by the number of dots. The value may range from 0 to 999 and the value 0 has a special meaning. That is, the value 0 means that the left margin value is automatically set by the present device.

The present device has means for measuring the width of the print form as described above. A left margin value is set depending on the character pitch, the right margin value and the width of the print form.

The right margin value is set similarly to the left margin value and hence it is not described here.

The character pitch value indicates the character pitch by the number of dots. The value may range from 7 to 999. The value 0, as noted above, means automatic setting. The value 7 means that the characters are printed with zero space.

The number of columns indicates the number of characters to be printed in one line.

The automatic setting of the print format values is further explained below. In the present embodiment, the left margin value, the right margin value and the character pitch value can be automatically set. All of those three values may be automatically set, or one or two of them may be automatically set. The values that are not set automatically are, preferentially, selected so that the present device determines the most efficient printing condition.

The operation of the present embodiment is now explained in detail.

Figure 8:
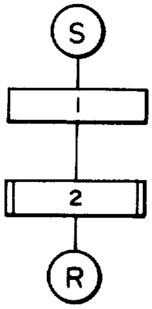
FIG. 8 illustrates an initialization process.

The present device is adapted to start the operation immediately after the power-on. FIG. 8 shows a flow of an initialization process which is carried out upon power-on. The respective steps are described below.

1. Clear the buffer DBUF. Turn off the error lamp.
2. Keyboard input process.

In the step 1, the buffer DBUF is cleared. That is, all positions are filled with codes so that the display on the display CRT is cleared. The error lamp EDP is turned off.

In the step 2, the keyboard input process is carried out. The device waits for a key input from the keyboard KB and processes the input data.

Figure 9:
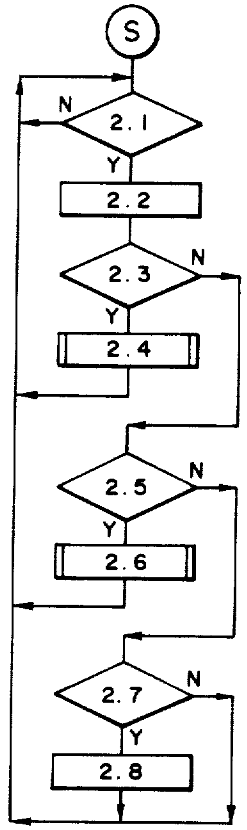
FIG. 9 illustrates a keyboard input process.

The keyboard input process in the step 2 is further explained with reference to FIG. 9. It includes the following general steps.

2.1 Is data input from the keyboard KB?
2.2 Read in the data from the keyboard KB.
2.3 Is the input data, data from the print key?
2.4 Print process.

2.5 Is the input data, data from the print position setting key?

2.6 Set the print position.

2.7 Is the inputted data an input edition data?

2.8 Input edition process.

The above general steps function precisely as follows.

Step 2.1: The device waits for input data from the keyboard KB.

Step 2.2: If the input data is supplied from the keyboard KB, the data is read in.

Steps 2.3 and 2.4: If the input data is the data from the print key, the print process is carried out.

Steps 2.5 and 2.6: If the input data is the data from the print position setting key, the print position is set.

Steps 2.7 and 2.8: If the input data is the input edition data, the input edition process in accordance with the input data is carried out.

The input edition process may include a character input process, an insertion process and a deletion process although they are not explained in detail because they have no direct connection with the present invention. In those steps, the character data is stored in the buffer DBUF.

Figure 10:
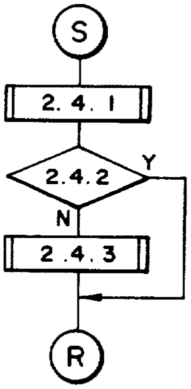
FIG. 10 illustrates a print process.

The print process in the step 2.4 is shown in detail in FIG. 10. It includes the following steps.

2.4.1 Set the print position (2.6).

2.4.2 Print error flag PEFG="1"?

2.4.3 Print data output process.

In the step 2.4.1, the print position is set (2.6). The print format is set in accordance with the format specified by the operator or automatically if the automatic setting is specified, and the validity of the format values is checked. If the check is OK, the print error flag PEFG is set to "0", and if the check is NO, the print error flag PEFG is set to "1". In the step 2.4.2, if the print error flag PEFG is "1", the process goes to a return point, and if the print error flag PEFG is "0", the process goes to the step 2.4.3 where the print data output process is carried out. That is, the characters are printed out.

In this manner, the print process is completed.

Figure 11:
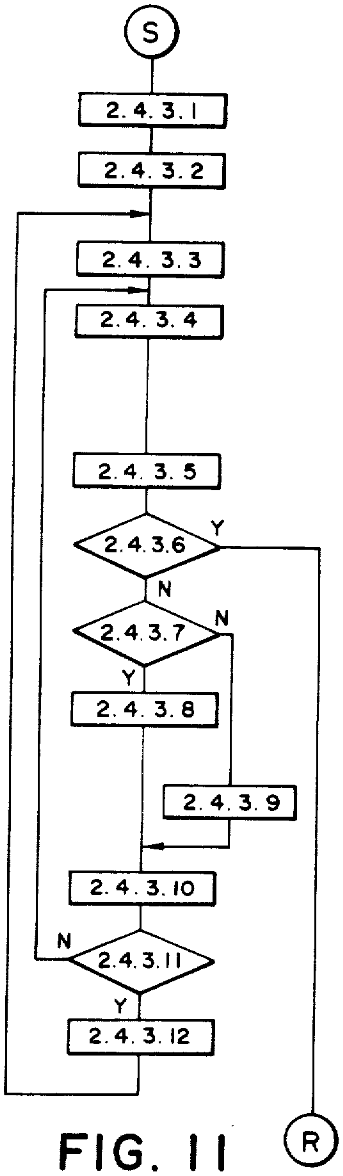
FIG. 11 illustrates a print data output process.

The print data output process in the step 2.4.3 is shown in detail in FIG. 11. It includes the following general steps.

2.4.3.1 SN≦1

2.4.3.2 Advance the print head by the left margin value (content of the LMR).

2.4.3.3 CN≦1

2.4.3.4 Convert the Sn-th data in the buffer DBUF to a pattern by referring the character generator CG and print the pattern advance the print head by seven dot positions.

2.4.3.5 Increment SN 2.4.3.6 Check if all of the data have been outputted.

2.4.3.7 CN≦PR2?

2.4.3.8 Advance the print head by (PR1−7+1) dot positions.

2.4.3.9 Advance the print head by (PR1−7) dot positions.

2.4.3.10 Increment CN 2.4.3.11 CN>CNSW?

2.4.3.12 Supply signals CR and LF to the printer.

The above general steps function precisely as follows.

Step 2.4.3.1: The current parameter SN which indicates the address of the data in the buffer DBUF is set to "1".

Step 2.4.3.2: The print head is advanced by the left margin value (content of the LMR).

Step 2.4.3.3: The current parameter CN which indicates the address of the data in a line or the column member is set to "1".

Step 2.4.3.4: The Sn-th coded data in the buffer DBUF is converted to the pattern by referring the character generator CG and the pattern is supplied to the printer for print-out. The print head is advanced by seven dot positions corresponding to the lateral width of one character.

Step 2.4.3.5: The parameter SN is incremented.

Step 2.4.3.6: The parameter SN is examined to check if all of the data in the buffer DBUF have been outputted. If all data have been outputted, the process goes to the return point. If not, the process goes to the step 2.4.3.7.

Step 2.4.3.7 to 2.4.3.9: The parameter CN is examined. If it is not larger than PR2, the print head is advanced by (PR1−7+1) dot positions, and if it is larger than PR2, the print head is advanced by (PR1−7) dot positions. In those steps, any error due to a residue of the calculated character pitch is compensated.

Step 2.4.3.10: The parameter CN is incremented.

Step 2.4.3.11: The parameter CN is examined to determine if it is larger than CNSW, that is, if the characters in the line have been printed. If CN>CNSW, the process goes to the step 2.4.3.12, and if not the process goes to the step 2.4.3.4.

Step 2.4.3.12: The carriage return signal CR and the line feed signal LF are supplied to the printer.

In this manner, the print data output process is completed.

Figure 12:
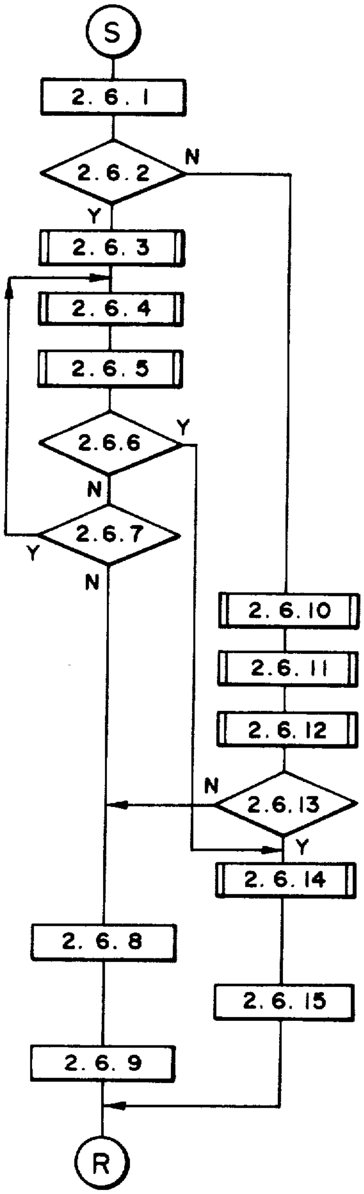
FIG. 12 illustrates a print position setting process.

The print position setting process in the step 2.6 is now explained with reference to FIG. 12. It includes the following general steps.

2.6.1 Turn off the error lamp.

2.6.2 Is the character pitch in automatic mode? (CPSW="0"?)

2.6.3 Set margin.

2.6.4 Calculate pitch.

2.6.5 Check pitch.

2.6.6 Is the pitch check flag PCFG "1"?

2.6.7 Is recalculation of pitch necessary?

2.6.10 Set pitch.

2.6.11 Calculate margin.

2.6.12 Check margin.

2.6.13 Is the margin check flag MCFG "1"?

2.6.14 Display print position.

2.6.8 Turn on the error lamp.

2.6.15 Reset the print error flag PEFG.

2.6.9 Set the print error flag PEFG.

The above general steps function precisely as follows.

Step 2.6.1: The error lamp is turned off.

Step 2.6.2: It is determined if the character pitch setting is in the automatic mode or not. If YES (CPSW="0"), the process goes to the step 2.6.3, and if NO the process goes to the step 2.6.10.

Step 2.6.3: The margin setting process is carried out. The margins are set first. If the margins have already been set, they are used as the margin valves. If only one of the margins has been set, the unset margin value (automatically set margin value) is tentatively set to be equal to the already set margin value. If none of the left and right margin values have been set (that is, if they are to be set automatically), 10% value of the form which is tentatively allotted to the left and right margin values.

Step 2.6.4: The character pitch is calculated. It can be calculated based on the given left margin value, right margin value, form width and number of columns.

Step 2.6.5: The character pitch is checked to determine if the pitch calculated in the step 2.6.4 is valid. If it is valid, the pitch check flag PCFG is set to "1" and the pitch recalculation flag RPFG is reset to "0". If the decision is invalid, the margin values are set again if the modification of the margin values and the recalculation of the character pitch are permitted, and the pitch check flag PCFG and the pitch recalculation flag RPFG are set to "1". If the modification of the margin values is not permitted, the pitch check flag PCFG and the pitch recalculation flag RPFG are reset to "0".

Step 2.6.6: If the pitch check flag PCFG is "1", the process goes to the step 2.6.14. If it is not "1", the step goes to 2.6.7.

Step 2.6.7: If the pitch recalculation flag RPFG is "1", the process goes to the 2.6.4. If it is not "1", the process goes to the step 2.6.8.

Step 2.6.8: Since the invalidity of the print format has been determined, the error lamp EDP is turned on.

Step 2.6.9: The print error flag PEFG is set to "1" and the process goes to the return point.

Step 2.6.10: The character pitch is set. The pitch calculated in the step 2.6.4 or 2.6.5 is set as the character pitch.

Step 2.6.11: The margin values are set. The margin values are calculated based on the given character pitch, form width and number of columns. One or both of the left and right margin values may be automatically set, or none of them may be automatically set.

Step 2.6.12: The margin values are checked to determine if the set or calculated margin values are valid. If they are invalid, the margin check flag MCFG is reset to "0", and if they are valid the margin check flag MCFG is set to "1".

Step 2.6.13: If the margin check flag MCFG is "1", the process goes to the step 2.6.14. If it is not "1", the process goes to the step 2.6.8.

Step 2.6.14: The print position is displayed. The print format values determined are displayed on the print display.

Step 2.6.15: The print error flag PEFG is reset to "1". The process goes to the return point. In this manner, the print position setting process is completed.

Figure 13:
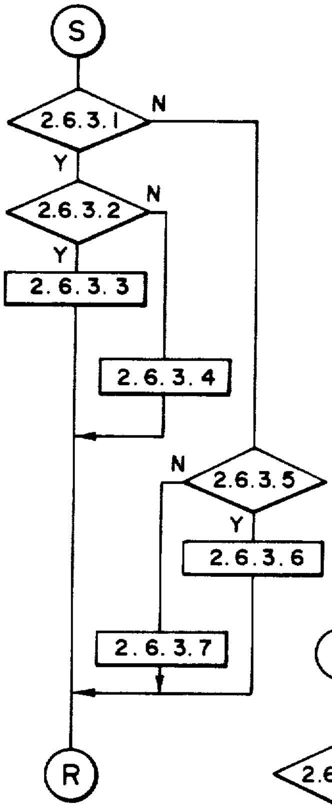
FIG. 13 illustrates a margin setting process.

The margin set process in the step 2.6.3 is now explained with reference to FIG. 13. It includes the following general steps.

2.6.3.1 Is the left margin setting automatic? (LMSW="0"?)

2.6.3.2 Is the right margin setting automatic? (RMSW="0"?)

2.6.3.3 LMR PAWD/10 +7 (integer operation)
RMR←LMR 2.6.3.4
LMR←RMSW
RMR←RMSW 2.6.3.5 Is the right margin setting automatic? (RMSW="0"?)

2.6.3.6
LMR←LMSW
RMR←LMSW 2.6.3.7
LMR←LMSW
RMR RMSW

The above general steps function precisely as follows.

Steps 2.6.3.1, 2.6.3.5 and 2.6.3.6: If only the right margin setting is automatic, both the left margin value and the right margin value are set to the same left margin value.

Steps 2.6.3.1, 2.6.3.5 and 2.6.3.6: If none of the left margin setting and the right margin setting are automatic, the respective margin values are set.

Steps 2.6.3.1, 2.6.3.2 and 2.6.3.4: If only the left margin setting is automatic, both the left margin value and the right margin value are set to the same right margin value.

Steps 2.6.3.1, 2.6.3.2 and 2.6.3.3: (10% value of the form width)+7 is set to the left and right margin values. The residue is cut away. The left and right margin values may be determined in another way provided that they are functions of the form width.

In the present embodiment, the left and right margin values are determined in the steps 2.6.3.3, 2.6.3.4 and 2.6.3.6 such that the character string is centered relative to the print form. Alternatively, the left margin value may be set larger than the right margin value to leave a gluing space or binding space.

Figure 14:
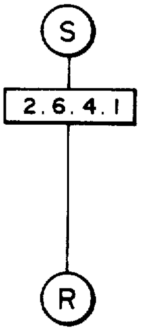
FIG. 14 illustrates a pitch calculation process.

The pitch calculation process in the step 2.6.4 is explained in detail with reference to FIG. 14. It includes the following precise steps.

2.6.4.1 Divide (PAWD-LMR-RMR) by CNSW to get a quotient PR1 and a residue PR2.

By subtracting the left and right margin values from the form width and dividing the difference by the number of characters (columns) in a line, the character pitch is determined. The quotient is represented by PR1 and the residue is represented by PR2. This completes the pitch calculation process.

Figure 15:
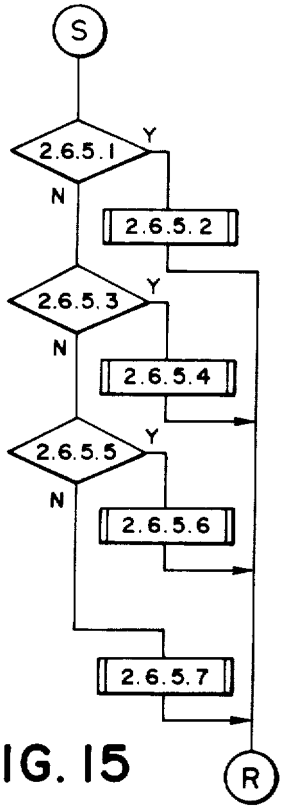
FIG. 15 illustrates a pitch check process.

The pitch check process is explained in detail with reference to FIG. 15. It includes the following general steps.

2.6.5.1 PR1$\leqq$6?

2.6.5.2 PR6 pitch check process.

2.6.5.3 PR1$\leqq$8?

2.6.5.4 PR8 pitch check process.

2.6.5.5 PR1$\leqq$10?

2.6.5.6 PR10 pitch check process.

2.6.5.7 PR11 pitch check process.

The above general steps function precisely as follows.

Steps 2.6.5.1 and 2.6.5.2: If the character pitch is too small (PR1$\leqq$6), the PR6 pitch check process is carried out.

Steps 2.6.5.3 and 2.6.5.4: If the character pitch is slightly small (7$\leqq$PR1$\leqq$8), the PR8 pitch process is carried out.

Steps 2.6.5.5 and 2.6.5.6: If the character pitch is reasonable (9$\leqq$PR1$\leqq$10), the PR10 pitch check process is carried out.

Step 2.6.5.7: If the character pitch is slightly large (PR1$\geqq$11), the PR11 pitch check process is carried out.

In the present embodiment, the slightly small character pitch and the slightly large character pitch are subjective and their values may be determined experimentarily. Some of the pitch check processes may be omitted. In this manner, the pitch check process is completed.

Figure 16:
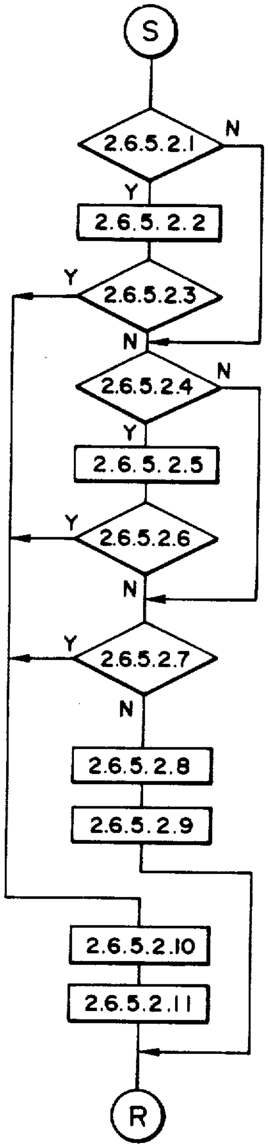
FIG. 16 illustrates a PR6 pitch check process.

The PR6 pitch check process is explained in detail with reference to FIG. 16. It includes the following general steps.

2.6.5.2.1 LMSW="0"?

2.6.5.2.2 LMR←LMR−1
2.6.5.2.3 LMR<2?
2.6.5.2.4 RMSW="0"?
2.6.5.2.5 RMR←RMR−1
2.6.5.2.6 RMR<2?
2.6.5.2.7 LMSW≠"0"? and RMSW≠"0"?
2.6.5.2.8 Set pitch recalculation flag RPFG to "1".
2.6.5.2.9 Reset pitch check flag PCFG to "0".
2.6.5.2.10 Reset pitch recalculation flag RPFG to "0".
2.6.5.2.11 Set pitch check flag PCFG to "1".

The above general steps function precisely as follows.

Step 2.6.5.2.1: If the left margin setting is automatic (LMSW="0"), the process goes to the step 2.6.5.2. If not, the step goes to the step 2.6.5.2.4.

Step 2.6.5.2.2: Subtract 1 from the left margin value (LMR←LMR−1)

Step 2.6.5.2.3: If LMR<2, that is, if the left margin value is smaller than a predetermined value (which is 2 in the present embodiment but it may be different for the left and right margin values), the process goes to the step 2.6.5.2.4.

Steps 2.6.5.2.4–2.6.5.2.6: The same process is carried out for the right margin value.

Step 2.6.5.2.7: If none of the left and right margin setting is automatic, the process goes to the step 2.6.5.2.10. Otherwise, the process goes to the step 2.6.5.2.8.

Step 2.6.5.2.8 and 2.6.5.2.9: The pitch recalculation flag RPFG is set to "1" and the pitch check flag PCFG is reset to "0".

Steps 2.6.5.2.10 and 2.6.5.2.11: The pitch recalculation flag PRFG is reset to "0" and the pitch check flag PCFG if reset to "0".

While the left and right margin values are reduced by one dot, at a time respectively, in the steps 2.6.5.2.2 and 2.6.5.2.5 of the present embodiment, they may be reduced several dots at a time. The reduction value may be different from the left and right margin values.

Figure 17:
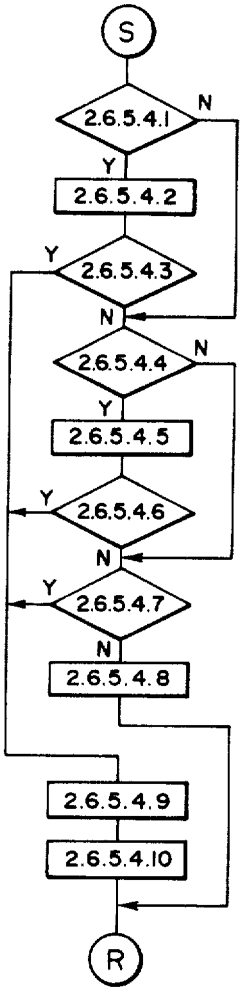
FIG. 17 illustrates a PR8 pitch check process.

The PR8 pitch check process in the step 2.6.5.4 is explained in detail with reference to FIG. 17. It includes the following steps.

2.6.5.4.1 LMSW="0"?
2.6.5.4.2 LMR←LMR−1
2.6.5.4.3 LMR<7?
2.6.5.4.4 RMSW="0"?
2.6.5.4.5 RMR←RMR−1
2.6.5.4.6 RMR<7?
2.6.5.4.7 LMSW≠"0"? and RMSW≠"0"?
2.6.5.4.8 Set pitch recalculation flag RPFG to "1".
2.6.5.4.9 Reset pitch check flag PCFG to "0".
2.6.5.4.10 Reset pitch recalculation flag RPFG to "0"
2.6.5.4.11 Set pitch check flag PCFG to "1".

The above process is essentially identical to the PR6 pitch check process 2.6.5.2 except that the print format error is indicated if the modification of the left and right margin values is not permitted in the PR6 pitch check process while the print format error is not indicated even if the modification of the left and right margin values is not permitted in the PR8 pitch check process. In the steps 2.6.5.4.9 and 2.6.5.4.10, the pitch recalculation flag RPFG is reset to "0" and the pitch check flag PCFG is set to "1".

Figure 18:
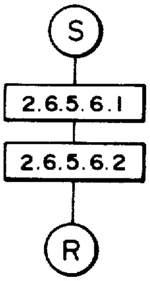
FIG. 18 illustrates a PR10 pitch check process.

The PR10 pitch check process in the step 2.6.5.6 is explained in detail with reference to FIG. 18. It includes the following steps.

2.6.5.6.1 Reset the pitch recalculation flag RPFG to "0".
2.6.5.6.2 Set the pitch check flag PCFG to "1".

In the above steps, the pitch recalculation flag RPFG is reset to "0" and the pitch check flag PCFG is set to "1".

Figure 19:
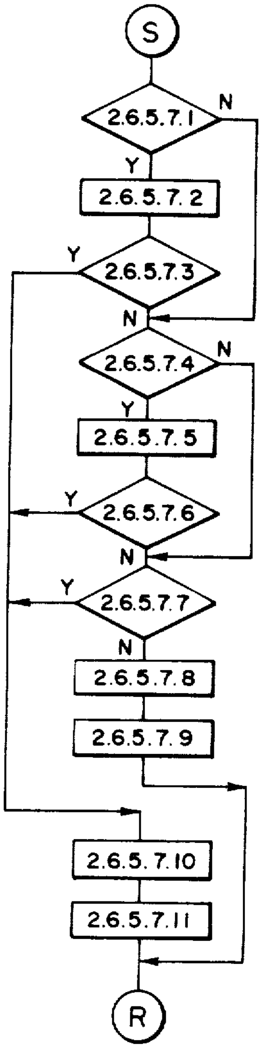
FIG. 19 illustrates a PR11 pitch check process.

The PR11 pitch check process in the step 2.6.5.7 is explained in detail with reference to FIG. 19.

2.6.5.7.1 LMSW="0"?
2.6.5.7.2 LMR←LMR+1
2.6.5.7.3 LMR>(PAWD/2−7)?
2.6.5.7.4 RMSW="0"?
2.6.5.7.5 RMR←RMR+1
2.6.5.7.6 RMR>(PAWD/2−7)?
2.6.5.7.7 LMSW≠"0"? and RMSW≠"0"?
2.6.5.7.8 Set the pitch recalculation flag RPFG to "1".
2.6.5.7.9 Reset the pitch check flag PCFG to "0".
2.6.5.7.10 Reset the pitch recalculation flag RPFG to "0".
2.6.5.7.11 Set the pitch check flag PCFG to "1".

This process is essentially identical to the PR6 pitch check process. The differences between the PR11 pitch check process and the PR6 pitch check process are shown below.

Steps 2.6.5.7.2 and 2.6.5.7.5: The left and right margin values are not decremented but incremented.

Steps 2.6.5.7.3 and 2.6.5.7.6: The maximum value of the left and right margin values is equal to PAWD/2−7. It is one half of the form width less 7 dot length.

Steps 2.6.5.7.10 and 2.6.5.7.11: If the modification of the left and right margin values is not permitted, the pitch recalculation flag RPFG is reset to "0" and the pitch check flag PCFG is set to "1".

Figure 20:
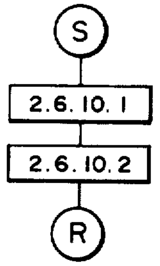
FIG. 20 illustrates a pitch setting process.

The pitch setting process of the step 2.6.10 is explained below with reference to FIG. 20. It includes the following steps.

2.6.10.1 PR1←CPSW
2.6.10.2 PR2←0

In the steps 2.6.10.1 and 2.6.10.2 the character pitch is set to the value set by the character pitch switch. That is,

PR1←CPSW
PR2←0

Figure 21:
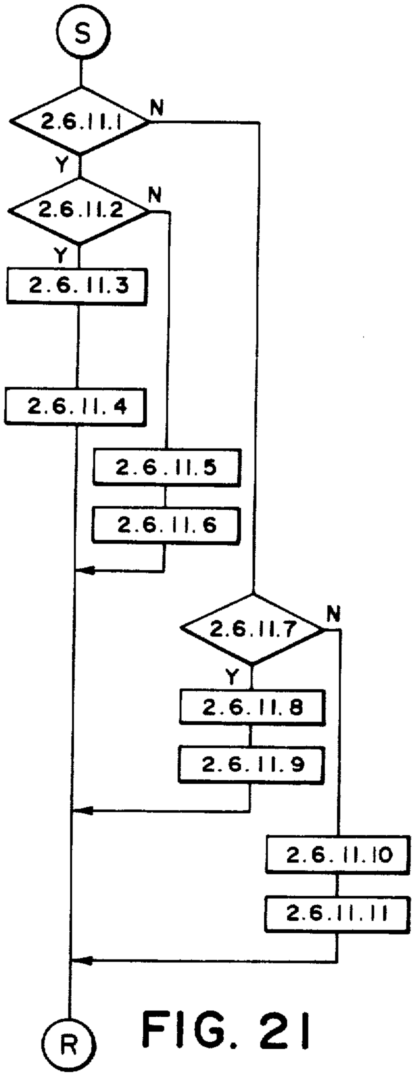
FIG. 21 illustrates a margin calculation process.

The margin calculation process in the step 2.6.11 is explained in detail with reference to FIG. 21.

2.6.11.1 LMSW="0"?
2.6.11.2 RMSW="0"?
2.6.11.3 LMR←(PAWD−CPSW×CNSW)/2
Cut away a residue
2.6.11.4 RMR←PAWD−LMR
2.6.11.5 RMR←RMSW
2.6.11.6 LMR←PAWD−CPSW×CNSW−RMSW
2.6.11.7 RMSW "0"?
2.6.11.8 LMR←LMSW
2.6.11.9 RMR←PAWD−CPSW×CNSW−LMSW
2.6.11.10 LMR←LMSW
2.6.11.11 RMR←RMSW In the steps 2.6.11.1, 2.6.11.2, 2.6.11.3 and 2.6.11.4, if the left and right margin values are to be automatically set, LMR is set to (PAWD−CPSW×CNSW)/2 and the residue is cut away, and RMR is set to PAWD−LMR.

In the steps 2.6.11.1, 2.6.11.2, 2.6.11.5 and 2.6.11.6, if only the left margin value is to be automatically set, RMR is set to RMSW and LMR is set to PAWD−CPSW×CNSW−RMSW.

In the steps 2.6.11.1, 2.6.11.7, 2.6.11.8 and 2.6.11.9, if only the right margin value is to be automatically set, LMR is set to LMSW and RMR is set to PAWD−CPSW×CNSW−LMSW.

In the steps 2.6.11.1, 2.6.11.7, 2.6.11.10 and 2.6.11.11, if none of the left and right margin values is to be automatically set, LMR is set to LMSW and RMR is set to RMSW.

While the character string printed is centered relative to the print form in the steps 2.6.11.3 and 2.6.11.4, the left and right margin values may be set to different values. In this manner, the margin calculation process is completed.

Figure 22:
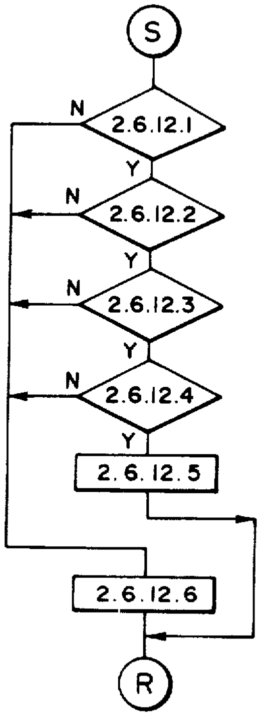
FIG. 22 illustrates a margin check process.

The margin check process in the step 2.6.12 is explained in detail with reference to FIG. 22. It includes the following steps.

2.6.12.1 LMR+RMR+PR1×CNSW≦PAWD?

2.6.12.2 LMR≧0?

2.6.12.3 RMR≧0?

2.6.12.4 PR1≧7?

2.6.12.5 Set the margin check flag MCFG to "1".

2.6.12.6 Reset the margin check flag MCFG to "0".

In the steps 2.6.12.1∼2.6.12.6, if

LMR+RMR+PR1×CNSW≦PAWD,

LMR≧0,

RMR≧0, and

PR1≧7 the print format is valid and the margin check flag MCFG is set to "1". Otherwise, the print format is invalid and the margin check flag MCFG is reset to "0". In this manner, the margin check process is completed.

Figure 23:
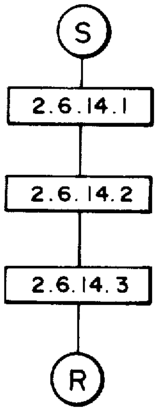
FIG. 23 illustrates a print position display process.

The print position display process in the step 2.6.14 is explained below with reference to FIG. 23. It includes the following steps.

2.6.14.1 Display the value of LMR on the left margin display.

2.6.14.2 Display the value of RMR on the right margin display.

2.6.14.3 Display the value of PR1 on the character pitch display.

In the steps 2.6.14.1∼2.6.14.3, the values of LMR, RMR and PR1 are displayed on the print format display.

Modifications of the present embodiment are now explained.

While four digital switches are provided in the present embodiment, they may be omitted. For example, when the left margin switch is omitted, the device may interpret it as automatic setting mode or a value inherent to the system may be preset. The same is true for the right margin switch and the character pitch switch are omitted. When the number of columns switch is omitted, the number of columns inherent to the system may be preset or the number of columns determined by the system may be used.

In the present embodiment, when the layout of the characters for the print form is to be determined, the character pitch or the margin values are determined with the number of characters (columns) in the line being fixed. Alternatively, the number of characters in the line may be varied with the character pitch or the margin values being fixed. Or all of the values may be variable so that the system determines optimum values.

In the present embodiment, when the left or right margin value is not specified, the character is centered for print-out. Alternatively, the left and right margin values may be different, for example, the left margin value may be larger than the right margin value to leave the gluing space. The gluing space may be varied depending on the form width.

While the present embodiment describes the application to the dot printer, the present invention is not only applicable to the dot printer but also applicable to a type printer. While the variable character pitch printer is used in the present embodiment, a non-variable character pitch printer may also be used in the present invention although the accuracy of the printing may be reduced.

While the character pitch and the left and right margin values are specified by the number of dot in the present embodiment, they may be specified by other units. For example, the character pitch may be expressed by the member of characters per unit length or by mm unit.

While the present embodiment is provided with the paper width measuring instrument, it is not necessarily provided. In the case, a digital switch may be provided so that the operator can specify the paper width or the system may automatically determine the paper width.

In the print position setting process of the present embodiment, it is determined whether the character pitch is to be automatically set or not in the step 2.6.2, and if it is to be automatically set, the process goes to the step 2.6.3. In the present embodiment, the left and right margin values are temporarily set in this step and then the character pitch is calculated and the validity of the calculated character pitch is checked. Alternatively, the character pitch may be temporarily set and then the left and right margin values may be calculated and the validity of the left and right margin values may be checked. In this case, the character pitch is incremented or decremented to set the optimum left and right margin values.

The paper width measuring instrument may linearly measure the paper width or may detect a particular size of the paper such as size A4 or A3.

While the output format is displayed by the number of dots in the present invention, it may be displayed by other units. For example, the character pitch may be expressed by the number of characters per unit, or the margin values and the character pitch may be represented by mm units.

What we claim is:

1. An output device for automatically producing a balanced output format, comprising:

means for determining a character pitch and margin values based on the width of a recording medium and the number of characters per line to be recorded on the recording medium;

check means for checking whether recording can be effected on the recording medium in accordance with the character pitch and margin values determined by said determining means; and recording control means for recording characters on the recording medium in accordance with the output of said determining means.

2. An output device according to claim 1, further comprising means for indicating the result of said check means.

3. An output device according to claim 1, further comprising means for manually instructing a check by said check means, said instructing means including a key.

4. An output device according to claim 1, further comprising a character pitch memory for storing the character pitch determined by said determining means.

5. An output device according to claim 4, further comprising character pitch input means for inputting a character pitch into said character pitch memory.

6. An output device according to claim 1, further comprising a margin memory for storing the margin values determined by said determining means.

7. An output device according to claim 6, further comprising margin value input means for inputting margin values into said margin memory.

8. An output device according to claim 1, further comprising means for measuring the width of the recording medium.

9. An output device for recording characters on a recording medium based upon the width of and margin values for the recording medium, said output device comprising:

means for determining a character pitch based on the width of a recording medium, margin values to be set for the recording medium and the number of characters per line to be recorded on the recording medium; and recording control means for recording characters on the recording medium in accordance with the output of said determining means.

10. An output device according to claim 9, further comprising check means for checking whether recording can be effected on the recording medium in accordance with the character pitch determined by said determining means.

11. An output device according to claim 10, further comprising instruction input means for instructing a check by said check means.

12. An output device according to claim 9, further comprising a character pitch memory for storing the character pitch determined by said determining means.

13. An output device according to claim 12, further comprising character pitch input means for inputting a character pitch into said character pitch memory.

14. An output device for automatically producing a balanced output format, comprising:

means for determining margin values of a recording medium based on the width of the recording medium, the number of characters per line to be recorded on the recording medium and a character pitch of the characters to be recorded on the recording medium; and recording control means for recording the characters on the recording medium in accordance with the margin values determined by said determining means.

15. An output device according to claim 14, further comprising check means for checking whether recording can be effected on the recording medium in accordance with the margin values determined by said determining means.

16. An output device according to claim 15, further comprising means for indicating the result of said check means.

17. An output device according to claim 16, wherein said indicating means includes visualizing means.

18. An output device for automatically producing a balanced output format, comprising:

means for determining margin values in accordance with the width of a recording medium;

check means for checking whether recording can be effected on the recording medium in accordance with margin values determined by said determining means; and recording control means for recording characters in accordance with the margin values determined by said means.

19. An output device according to claim 18, further comprising means for indicating the result of said check means.

20. An output device according to claim 19, wherein said indicating means includes visualizing means.

21. An output device according to claim 20, further comprising a margin memory for storing the margin values determined by said determining means.

22. An output device according to claim 21, further comprising margin value input means for inputting margin values into said margin memory.

23. An output device for recording character information in lines on a recording medium, comprising:

detection means for providing size information indicative of the size of the recording medium;

memory means for storing the number of characters per line of character information to be recorded on the recording medium;

processing means for producing at least one of (a) margin values to be set for the recording medium and (b) a character pitch, in accordance with size information provided by said detection means and the number of characters per line stored in said memory means; and storage means for storing at least one of the margin values and the character pitch obtained by said processing means.

24. An output device according to claim 23, further comprising check means for checking whether recording can be effected on the recording medium in accordance with the character pitch obtained by said processing means.

25. An output device according to claim 24, further comprising instruction input means for instructing a check by said check means.

26. An output device according to claim 25, further comprising character pitch input means for inputting a character pitch into said storage means.

27. An output device according to claim 24, further comprising means for indicating the result of said check means.

28. An output device according to claim 23, further comprising margin value input means for inputting margin values into said storage means.

* * * * *

UNITED STATES PATENT AND TRADEMARK OFFICE
CERTIFICATE OF CORRECTION

PATENT NO. : 4,546,449

DATED : October 8, 1985

INVENTOR(S) : KATSUMI MASAKI, ET AL.

It is certified that error appears in the above-identified patent and that said Letters Patent is hereby corrected as shown below:

Column 1, line 35, change "cannot varied" to --cannot be varied--.

Column 5, line 27, change "CG to convert" to --CG convert--;

line 31, change "which display" to --which displays--;

line 41, change "CPSW o the" to --CPSW or the--;

line 49, change "and, the" to --and the--; and lines 64-65, change "the printing" to --printing--.

Column 6, line 13, change "the depresses" to --the operator depresses--; and line 67, change "data, data" to --data data--.

Column 7, line 1, change "data, data" to --data data--.

UNITED STATES PATENT AND TRADEMARK OFFICE

CERTIFICATE OF CORRECTION

PATENT NO. : 4,546,449

DATED : October 8, 1985

INVENTOR(S) : KATSUMI MASAKI, ET AL.

It is certified that error appears in the above-identified patent and that said Letters Patent is hereby corrected as shown below:

Column 8, line 61, change "margin valves." to --margin values.--; and line 67, change "form which" to --form width--.

Column 9, line 21, change "the 2.6.4." to --the step 2.6.4.--.

Column 10, line 1, change "RMR RMSW" to --RMR ← RMSW--; and lines 61-62, change "experimentarily" to --experimentally--.

Column 11, line 1, change "LMR ≦ LMR-1" to --LMR ← LMR-1--;

line 34, change "if reset" to --is reset--; and line 39, change "different from" to --different for--.

Column 12, line 48, change "LMR←(PAWD" to --LMR ← (PAWD--;

line 50, change "RMR←PAWD" to --RMR ← PAWD--;

UNITED STATES PATENT AND TRADEMARK OFFICE

CERTIFICATE OF CORRECTION

PATENT NO. : 4,546,449

DATED : October 8, 1985

INVENTOR(S) : KATSUMI MASAKI, ET AL.

It is certified that error appears in the above-identified patent and that said Letters Patent is hereby corrected as shown below:

Column 12, line 51, change "RMR← RMSW" to --RMR $\stackrel{\leftarrow}{=}$ RMSW--;

line 52, change "LMR← PAWD" to --LMR $\stackrel{\leftarrow}{=}$ PAWD--;

line 53, change "RMSW "0"?" to --RMSW $\stackrel{\leftarrow}{=}$ "0"?--;

line 54, change "LMR← LMSW" to --LMR $\stackrel{\leftarrow}{=}$ LMSW--;

line 55, change "RMR← PAWD" to --RMR $\stackrel{\leftarrow}{=}$ PAWD--;

line 56, change "LMR← LMSW" to --LMR $\stackrel{\leftarrow}{=}$ LMSW--; and line 57, "RMR← RMSW" to --RMR $\stackrel{\leftarrow}{=}$ RMSW--.

Column 13, line 50, change "for" to --when--.

Column 14, line 12, change "number of dot" to --number of dots--;

line 15, change "member of" to --number of--; and line 19, change "In the case," to --In that case,--.

Signed and Sealed this

*Sixteenth* Day of *September 1986*

[SEAL]

*Attest:*

DONALD J. QUIGG

*Attesting Officer* *Commissioner of Patents and Trademarks*